C. F. COOPER.
FISH HOOK.
APPLICATION FILED FEB. 11, 1910.
973,479. Patented Oct. 25, 1910.
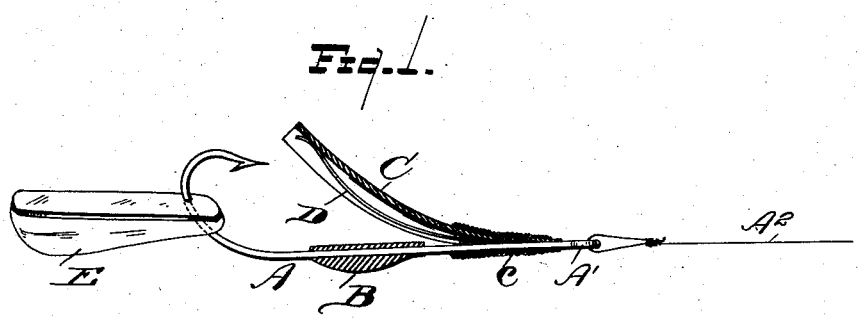
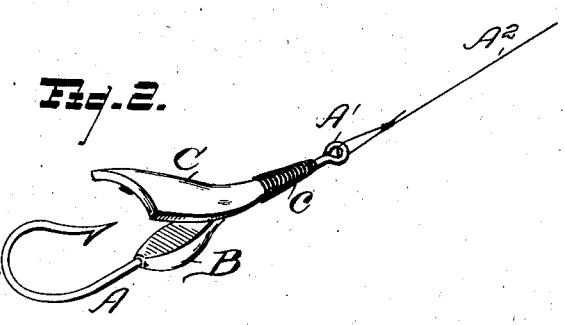
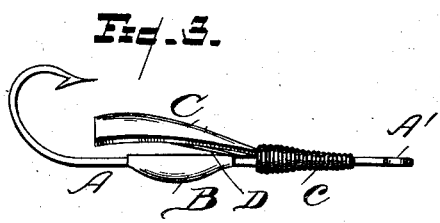
Witnesses
Albert U. Hofmann
Grace E. Wynkoop
Inventor
Charles F. Cooper
By S. E. Thomas
Attorney

UNITED STATES PATENT OFFICE.

CHARLES F. COOPER, OF DETROIT, MICHIGAN.

FISH-HOOK.

973,479.　　　　Specification of Letters Patent.　　Patented Oct. 25, 1910.

Application filed February 11, 1910. Serial No. 543,258.

*To all whom it may concern:*

Be it known that I, CHARLES F. COOPER, a citizen of the United States, residing at Detroit, county of Wayne, State of Michigan, have invented a certain new and useful Improvement in Fish-Hooks, and declare the following to be a full, clear, and exact description of the same, such as will enable others skilled in the art to which it pertains to make and use the same, reference being had to the accompanying drawings, which form a part of this specification.

My invention relates to an improvement in fish hooks, shown in the accompanying drawings and more particularly pointed out in the following specification and claim.

The object of this invention is to provide a hook adapted for casting along the shore among weeds,—the construction being such that the hook is guarded against entanglement with the weeds, the guard, however, not interfering with the hooking of the fish when it "strikes".

Another object is to provide a sinker integral with the hook which serves as an aid in carrying the line in casting, being of sufficient weight to carry the hook and bait just below the surface of the water immediately upon alighting.

Other advantages and improvements will hereafter appear.

In the drawings accompanying this specification: Figure 1 is a side elevation of the hook with parts in section. Fig. 2 is a perspective view of the hook. Fig. 3 is a side elevation showing the guard depressed.

Referring now to the letters of reference placed upon the drawings: A is the hook provided with the usual eye A' whereby it may be engaged to a line A².

B is a weight mounted upon the shank of the hook and integral therewith.

C is a guard formed of elastic material secured at one end to the shank of the hook, its free end rising above the plane of the barb, being relatively broad and preferably semi-circular in cross-section to more perfectly protect the hook from entanglement with weeds. The end of the guard engaged to the shank of the hook is made relatively narrow and is attached thereto by a series of cord or thread windings *c* afterward painted with a suitable waterproof coating.

D is a spring secured to the shank of the hook at one end; its free end bearing against the underside of the elastic guard to support it in its elevated position,—the free ends of the guard and spring in their normal position extending above the plane of the barb of the hook.

E denotes the bait.

Having indicated the several parts by reference letters, the construction and operation of the device will be readily understood.

The hook is first baited in the usual manner, preferably with a pork rind. In casting for a "strike" among weeds it will be seen that the flexible member will effectually guard the barb of the hook from entanglement with the weeds when winding in the line,—the relative breadth of the guard acting in connection with its arched shape serves to protect the hook in the event of any lateral movement of the flexible member due to striking weeds or other obstructions, while a narrow guard might be forced laterally beyond the point of the hook and thus become entangled with the weeds. By weighting the device, the hook may be more readily cast and upon touching the water it is so graduated as to cause the hook to sink just below its surface carrying with it the bait and guard, which latter also acts as a lure for the fish. Upon the mouth of the fish closing over the barbed end of the hook, the guard and its supporting spring bends freely under the pressure exerted by the fish thereby bringing the end of the guard below the plane of the barb of the hook resulting in its easy capture.

Having thus described my invention, what I claim is:—

In a device of the class described, a shank bent at one end to form a hook rigid therewith, a weight secured to the shank, and a comparatively broad guard having one end immovably secured to the shank in spaced relation to said weight, the guard extending upwardly over and shielding the weight with its body in spaced relation to the latter and with its outer free end terminating short of the beak of said hook.

In testimony whereof, I sign this specification in the presence of two witnesses.

CHARLES F. COOPER.

Witnesses:
　GRACE E. WYNKOOP,
　SAMUEL E. THOMAS.